United States Patent [19]
Hashimoto

[11] Patent Number: 4,690,660
[45] Date of Patent: Sep. 1, 1987

[54] DAMPER DISC

[75] Inventor: Yasuyuki Hashimoto, Katano, Japan

[73] Assignee: Kabushiki Kaisha Daikin Seisakusho, Osaka, Japan

[21] Appl. No.: 757,504

[22] Filed: Jul. 22, 1985

[30] Foreign Application Priority Data

Jul. 31, 1984 [JP] Japan ................. 59-162338

[51] Int. Cl.⁴ .................. F16D 3/14; F16D 47/02
[52] U.S. Cl. .................... 464/68; 192/106.2
[58] Field of Search ........... 188/378, 379, 380; 192/106.1, 106.2, 70.17, 70.18, 70.16, 107 R; 464/68, 81, 66, 67; 267/57, 154

[56] References Cited

U.S. PATENT DOCUMENTS

| | | | |
|---|---|---|---|
| 998,953 | 7/1911 | Capwell | 464/66 X |
| 1,510,943 | 10/1924 | Kjelsberg | 192/106.2 |
| 2,244,134 | 6/1941 | Thelander | 192/106.2 X |
| 2,321,941 | 6/1943 | Rose | 192/106.2 |
| 2,437,537 | 3/1948 | Kelleher | 192/106.2 |
| 2,674,863 | 4/1954 | Thelander | 192/106.2 |
| 4,148,200 | 4/1979 | Schallhorn et al. | 192/106.2 |
| 4,188,806 | 2/1980 | Fall et al. | 464/68 X |
| 4,279,132 | 7/1981 | Lamarche | 192/106.2 X |
| 4,351,168 | 9/1982 | Prince et al. | 192/106.2 X |
| 4,451,244 | 5/1984 | Lamarche | 192/106.2 X |
| 4,485,907 | 12/1984 | Nishimura | 192/106.2 |
| 4,493,408 | 1/1985 | Nagano | 192/106.2 |
| 4,493,674 | 1/1985 | Tamura et al. | 464/68 |
| 4,494,642 | 1/1985 | Hashimoto | 192/106.2 |
| 4,548,311 | 10/1985 | Lech | 464/68 X |
| 4,591,348 | 5/1986 | Takeuchi et al. | 192/106.2 X |

FOREIGN PATENT DOCUMENTS

| | | | |
|---|---|---|---|
| 1530543 | 2/1970 | Fed. Rep. of Germany . | |
| 70203 | 1/1952 | Netherlands | 464/66 |
| 1196811 | 7/1970 | United Kingdom . | |

*Primary Examiner*—Andres Kashnikow
*Assistant Examiner*—Robert J. Oberleitner
*Attorney, Agent, or Firm*—Burns, Doane, Swecker & Mathis

[57] ABSTRACT

A damper disc comprising a flange connected to a torque output part; a pair of side plates connected to a torque input part; and spring mechanisms for soft and hard torsion operations for connecting the side plates to the flange; characterized in that; the spring mechanism for the soft torsion operation includes a pair of first springs, a second spring disposed circumferentially between the first springs in series and engagement parts disposed at both ends of the second spring and operable to engage with edges of the openings; one of the openings in the flange and each side plate is designed to support both ends of the spring mechanism for the soft torsion operation and to form circumferential first spaces with respect to the engagement part in a neutral position, other of the openings in the flange and each side plate is designed to support both ends of the spring mechanism for the soft torsion operation and to form circumferential second spaces longer than the first spaces with respect to the engagement parts in the neutral position.

3 Claims, 3 Drawing Figures

DAMPER DISC

BACKGROUND OF THE INVENTION

The present invention relates to a damper disc used as a clutch disc of an automobile and others, and particularly, to a damper disc including stepped damping characteristics.

Conventionally, a disc including a stepped characteristic requires springs, of which number is at least same as a number of steps or stages in the damping characteristics. Particularly, if it is required to provide a sufficiently strong maximum rigidity against relative torsion or twist of input and output members, it is necessary to provide springs more than number of the operation stages. For example, if the disc is required to operate at four damping stages, i.e., soft, medium soft, medium hard, and hard stages, it is usually necessary to provide six or more sets of the springs in the disc. Therefore, many openings for the springs should be formed in a flange of a splined hub. Particularly, in the disc having a large maximum torsion angle, the disc should be provided with the long and wide openings and recesses for the springs and stopper pins, and thus, lengths between the adjacent openings and recesses become short, resulting in a weak strength of the flange.

Further in the conventional structures, the spring or springs for the first, i.e., weak, torsion operation are adapted to be compressed through the whole torsion area, i.e., until a torsion angle increases to a maximum value, so that a compressed length of the first spring becomes large, and thus, the stress thereof also becomes extremely large. Therefore, it is hard to maintain a sufficient strength in the first spring.

SUMMARY OF THE INVENTION

Accordingly, it is an object of the invention to provide an improved structure, overcoming such disadvantages that wide openings are required in the flange of the disc and that the first spring is compressed through the whole torsion area.

According to the present invention, a damper disc comprises a flange connected to a torque output part; a pair of side plates connected to a torque input part; and spring mechanisms for soft and hard torsion operations for connecting the side plates to the flange; and is characterized in that; said spring mechanism for the soft torsion operation includes a pair of first springs, a second spring disposed circumferentially between said first springs in series and engagement parts disposed at both ends of said second spring and operable to engage with edges of said openings; one of said openings in the flange and each side plate is designed to support both ends of the spring mechanism for the soft torsion operation and to form circumferential first spaces with respect to said engagement part in a neutral position, the other of said openings in the flange and each side plate is designed to support both ends of the spring mechanism for the soft torsion operation and to form circumferential second spaces longer than said first spaces with respect to the engagement parts in the neutral position.

According to the above structures, in a first torsion stage in which a transmitted torque is small, the first springs at both sides of the second spring are compressed, so that the side plates twist relatively to the flange through an angle corresponding to a sum of the first spaces at both sides of the second spring. However, in the first torsion operation, the second spring and the spring mechanism for the hard torsion operation circumferentially move relatively to the side plates or the flange through an angle corresponding to the first space at one side of the second spring.

After the engagement part at one side of the second spring of the spring mechanism for the soft torsion operation engages directly with the edge of the opening, one of the first springs of the spring mechanism for the soft torsion operation is not compressed further, and only the other first spring and the second spring are compressed. Subsequently, the other engagement part of the second spring engages with the edge of the opening, so that only the second spring is compressed in the spring mechanism for the soft torsion operation.

DETAILED DESCRIPTION OF THE PREFERRED EMBODIMENTS

Figure 2:
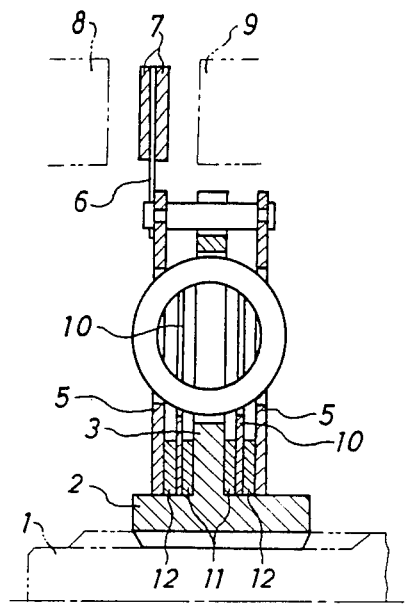
FIG. 2 is a schematic sectional view of the embodiment in FIG. 1 taken along line II—II in FIG. 1.

Referring to FIG. 2, a hub 2 (i.e., output part) splined to an output shaft 1 is provided at the outer periphery with an annular flange 3, at opposite sides of which are concentrically disposed a pair of annular side plates 5. Cushioning plates 6 are fixed to the outer peripheral portion of the side plate 5 (i.e., clutch plate). Friction facings 7 (i.e., input part) is fixed to both surfaces of the cushioning plates 6. The facings 7 are positioned between a flywheel 8 and a pressure plate 9. A pair of annular sub-plates 10 are disposed between the flange 3 and the side plates 5, respectively. First friction members 11 having a weak frictional force are interposed between the radially inner portions of the flange 3 and the sub-plates 10, respectively. Second friction members 12 having a strong frictional force are interposed between the radially inner portions of the side plates 5 and the sub-plates 10, respectively.

Figure 1:
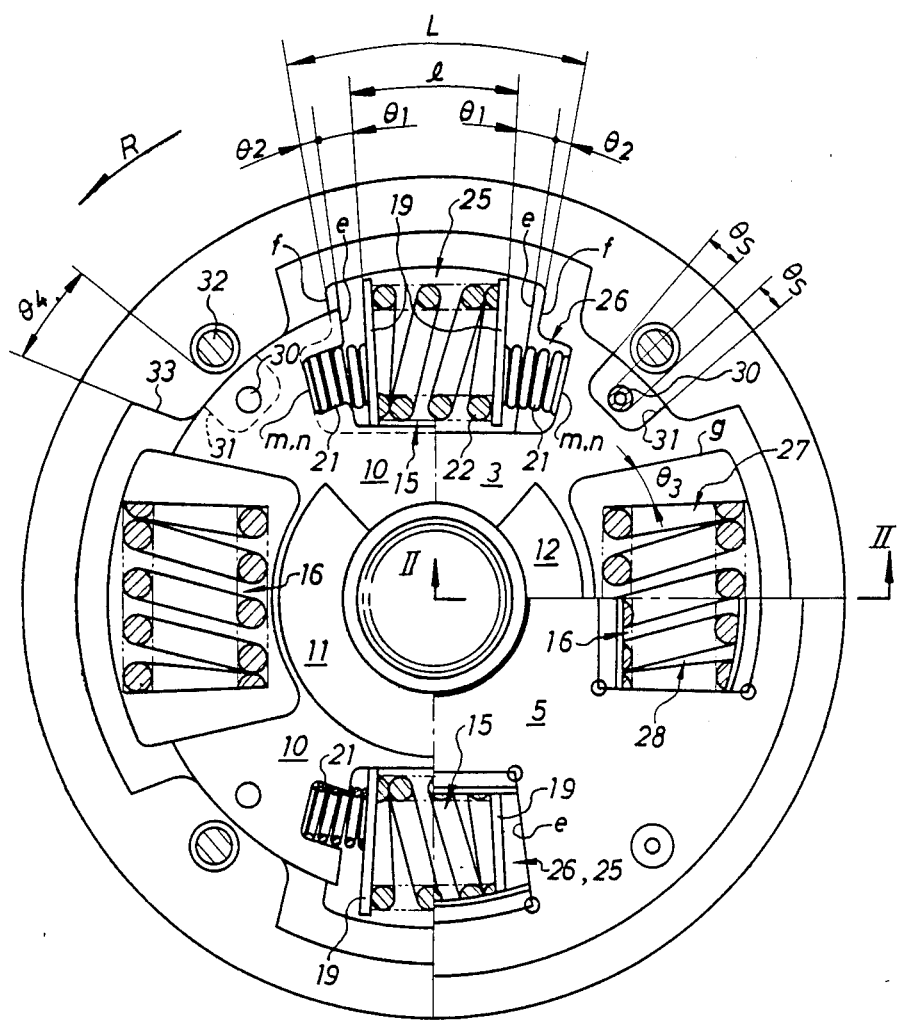
FIG. 1 is a schematic elevational view of an embodiment of the invention with certain parts cut-away.

Referring to FIG. 1, the disc is provided with circumferentially equally spaced two spring mechanisms 15 and two spring mechanisms 16. The spring mechanism 15 is designed to effectively operate at small torsion angle ranges, i.e., first, second and third torsion stages. The spring mechanism 16 is designed to operate at a large torsion angle range, i.e., fourth torsion stage.

Each torsion spring mechanism 15 is provided with one second spring 22 of high rigidity and two first springs 21 of low rigidity, all of which are compressible coil springs extending in a substantially circumferential direction of the disc. The second torsion spring 22 is arranged in series circumferentially between the first springs 21. The second spring 22 has a larger diameter than the first springs 21. Plate-like spring seats 19, i.e., engagement parts, of a large diameter are interposed between the second spring 22 and the first springs 21, respectively.

The spring mechanisms 15 are disposed in openings 25 in the flange 3 and openings 26 in the side plates 5. The configuration of each opening 25 in the flange 3 is similar to the configuration of the whole springs 21 and 22. Each opening 25 is provided with radially outer side edges f and radially inner side edges m. A circumferential length L between the edges f is shorter than a length between the edges m. In other words, the circumferentially middle portion having the length L of each opening 25 has a longer radial width than the circumferentially end portions of the opening 25. The length L is longer than a circumferential length l between both spring seats 19. In an illustrated neutral position, a space corresponding to a torsion angle of $\theta1+\theta2$, i.e., a sum of a first torsion angle of $\theta1$ and a second torsion angle of $\theta2$, is formed between the spring seat 19 and the radially outer side edge f. In the illustrated position, a circumferentially outer end of each spring 21 opposite to the seat 19 is seated onto the radially inner side edge m of the opening 25.

Each radial edge e of the side plate is straight, as shown in FIG. 1. A hollow edge n is formed in the subplate 10 and engages the spring 21, as shown in FIG. 1. During the first torsion operation, the springs 21 are compressed by the side plates 5 since the sub-plates 10 are frictionally connected with the sub-plates 10 by the friction members 12, and since the springs are thus engaged by the edge n.

Each spring mechanism 16 for the hard torsion operation consists of one compressible coil spring. This spring (16) has a large diameter and a high rigidity and is disposed in openings 27 and 28 in the flange 3 and the side plates 5. In the illustrated neutral position, i.e., non-torsion position, both ends of each spring mechanism 16 are apart from the side edges g of the opening 27 in the flange 3 with spaces corresponding to angles of $\theta3$ therebetween, and are seated on side edges of the openings 28 in the side plates 5.

Both sub-plates 10 are fixed together at four outer peripheral portions by sub-pins 30, which extend through recesses 31 provided at the outer periphery of the flange 3. In the illustrated neutral position, spaces respectively corresponding to an angle of $\theta s$ is formed between the side edges of each recess 31 and the sub-pin 30. Both side plates 5 are fixed together at four outer peripheral portions by stop pins 32, which extend through recesses 33 provided at the outer periphery of the flange 3. In the illustrated neutral position, spaces respectively corresponding to an angle of $\theta4$ are formed between the side edges of each recess 33 and the stop pin 32.

An operation is as follows:

When the facing 7 in FIG. 2 is pressed on to the flywheel 8 of a driving engine by the pressure plate 9, a torque is transmitted from the flywheel 8 through the facing 7 to the side plates 5, and thus, the disc rotates at an direction indicated by an arrow R in FIG. 1. This torque is transmitted from the side plates 5 through the spring mechanisms 15 and 16, flange 3 and hub 2 to the output shaft 1 (FIG. 2). In this operation, the spring mechanisms 15 and 16 are compressed by a force corresponding to the transmitted torque, so that the side plates 5 twist or torsionally turn relatively to the flange 3, as will be detailed below.

In a first stage in which the torsion torque is small, the spring mechanisms 16 and the second springs 22 are spaced from the edges g, f and e of the openings 25, 26 and 27, so that only the first springs 21 are mainly compressed. In this operation, two first springs 21 arranged in series in each spring mechanism 15 are compressed. Therefore, the rigidity against the torsion is low, and, as indicated at a section a in FIG. 3, a rate of increasing of the transmitted torque with respect to increasing of the torsion angle is very small. In this stage, the torsion angle of the side plates 5 with respect to the flange 3 corresponds to a sum of compressed lengths of the two first springs 21.

When the torsion angle becomes the double of the angle of $\theta1$ ($\theta1\times2$), the first springs 21 are compressed by the length corresponding the angle of $\theta1$, respectively, and the side plates 5 are in a position turned through the angle of $\theta1$ in the rotating direction R with respect to the second springs 22, so that the edges e of the openings 26 are in contact with the spring seats 19 of the second springs 22. Therefore, in a second stage thereafter, there is no further compression in the trailing first springs 21 which are positioned at the rear of the second springs 22 in the rotating direction R, i.e., the springs 21 adjacent to the edges e and the seats 19 contacting together, and only the front first springs are compressed. Therefore, in the second stage, as indicated at a section b in FIG. 3, the rate of the increasing of the transmitted torque with respect to the increasing of the torsion angle becomes larger than that in the first stage (a).

When the torsion angle becomes a value of ($\theta1\times2+\theta2$), the second springs 22 are in a position turned through an angle of ($\theta1+\theta2$) in the rotating direction R. Therefore, in a third stage thereafter, the front first springs 21 are not compressed either, and only the second springs 22 are compressed. Consequently, as indicated at a section c in FIG. 3, the rate of the increasing of the transmitted torque with respect to the increasing of the torsion angle becomes larger than that in the second stage (b).

When the torsion angle increases further and the spring mechanisms 16 are turned through the angle $\theta3$ in the rotating direction R together with the side plates 5, the spring mechanisms 16 contact the edges g of the openings 27 in the flange 3. In a fourth stage thereafter, as indicated at a section d in FIG. 3, the rate of the increasing of the transmitted torque with respect to the increasing of the torsion angle becomes larger than that in the third stage (c).

When the torsion angle further increases, and the side plates 5 twist through an angle of $\theta4$ relatively to the flange 3, the stop pins 32 contact the edges of the recesses 33, and thus, further twisting is prevented.

Figure 3:
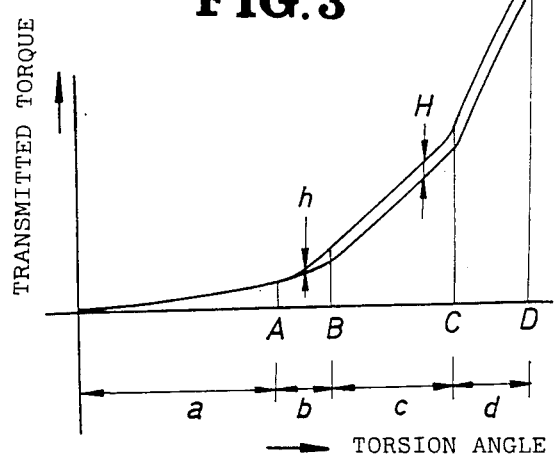
FIG. 3 is a graph showing damping characteristic.

In the above torsion operation, at the initial stages, the sub-plates 10 are unrotatably connected by the strong frictional force of the friction members 12 to the side plates 5, and thus, twist relatively to the flange 3, so that friction occurs on the friction members 11 having the weak frictional force, and thus, a small hysteresis torque (not shown) is generated in the first stage a. In the second stage b, the side edges e contact the spring seats 19 and this contact pressure gradually increases, so that a hysteresis torque h gradually increases as shown in FIG. 3, In the stages c and d thereafter, the sub-plates 10 have turned through the angle of $\theta s$ with respect to the flange 3, and the sub-pins 30 engage with the side edges of the recesses 31 in the flange 3. Therefore, the sub-plates 10 are in the condition rigidly connected to the flange 3, and the side plates 5 twist relatively to the sub-plates 10 and the flange 3. Consequently, the friction occurs on the surfaces of the friction members 12 having the strong frictional force, and thus, a large hysteresis torque H is added in the damping characteristics.

As described above, in the damping operations, the damping rigidity (inclination) and the hysteresis torque change in some steps or stages, respectively. And the hysteresis torque changes gradually and continuously in accordance with said contact pressure. Therefore, the torque vibration is effectively absorbed through the whole area of the transmitted torque from the engine.

According to the invention, as detailed above, although the spaces corresponding only to the angle of $\theta_1$ are formed between each end of the second spring 22 and the side edges e of the openings in the side plates 5, the actual torsion angle A of the first stage a becomes the double of said angle of $\theta_1$ for the space. In other words, the angle of $\theta_1$ of the space for the first stage a can be the half of the torsion angle A of the first stage a. Whereby, the angles of the spaces for the second and third stages can be the values of $(\theta_1+\theta_2)$ and $\theta_3$, respectively, which are smaller by the angle of $\theta_1$ than the actual torsion angles B and C. Therefore, the circumferential lengths of the openings can be shorter than those corresponding to the actual torsion angles, so that the strength of the flange 3 and the side plates 5 can be increased. In other words, since the openings can be set to increase the maximum torsion angle without remarkable and large reduction of the strength by the openings, the sufficient abosrbing effect for the torque vibration can be obtained.

Further, since the first springs 21 are not compressed in the third and fourth stages, the maximum compressed lengths of the springs 21 can be small, so that breakage of them can be prevented.

In the illustrated embodiment, the disc is so designed that the hysteresis torque increases gradually, which further improves the absorbing effect for the torque vibration.

The invention can be so modified that, in the neutral position, the spring mechanisms 16 may be supported only by the openings 28 in the flange 3, and, in the second stage, the side edges f of the openings 25 in the flange 3 may be pressed against the second springs 22.

It is understood that the present disclosure of the preferred form may been changed in the details of construction and the combination and arrangement of parts may be resorted to without departing from the spirit and scope of the invention as hereinafter claimed.

What is claimed is:

1. A damper disc comprising:
   an annular flange having an inner peripheral portion and being connected at the inner peripheral portion to a torque output part;
   a pair of annular side plates each having an outer peripheral portion, the side plates being connected at the outer peripheral portions thereof to a torque input part and arranged relatively twistably to said flange;
   a pair of annular sub-plates arranged relatively twistably to said flange, and frictionally connected to the corresponding annular side plates during a soft torsion operation;
   a first spring mechanism for the soft torsion operation disposed in first openings in the side plates, first openings in the sub-plates, and first openings in the flange for connecting the side plates to the flange;
   said first spring mechanism for the soft torsion operation including:
   a pair of first springs,
   a second spring disposed circumferentially between said first springs in series, and
   a pair of engagement parts, each disposed at a corresponding end of said second spring and operable to engage with edges of said first openings;
   said first opening in one of the flange and each side plate being designed to support both ends of the first spring mechanism for the soft torsion operation and to form a circumferential first space with respect to said engagement part in a neutral position,
   the other of said first openings in the flange and each side plate being designed to support both ends of the first spring mechanism for the soft torsion operation and to form a circumferential second space longer than said first space with respect to the engagement parts in the neutral position; and
   a second spring mechanism for a hard torsion operation disposed in second openings in the side plates and second openings in the flange for connecting the side plates to the flange;
   wherein said second spring of said first spring mechanism for the soft torsion operation consists of a compressible coil spring of large diameter, said each first spring consists of a compressible coil spring of a diameter smaller than that of said second spring, said openings in the combination of the side plate and the sub-plate, and the openings in the flange for the first spring mechanism for the soft torsion operation have configurations nearly similar to that of the first spring mechanism for the soft torsion operation, and said each opening in the sub-plate and in the flange has a pair of side edges having circumferentially long length therebetween for supporting the ends of the first spring and a pair of side edges having a circumferentially short length therebetween and operable to support said engagement parts.

2. The damper disc as claimed in claim 1 wherein said engagement parts consist of spring seat onto which an end of one of the first springs and an end of the second spring are seated from opposite sides.

3. The damper disc of claim 1 wherein said first springs have a first stiffness and wherein said second spring has a second stiffness, the second stiffness being greater than the first stiffness.

* * * * *